June 4, 1968 A. E. HAND 3,386,125
DOOR BUMPER
Filed Oct. 14, 1965
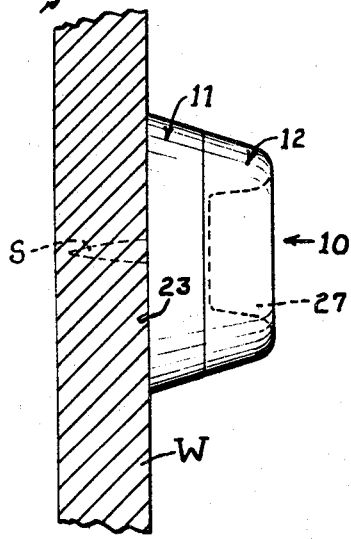
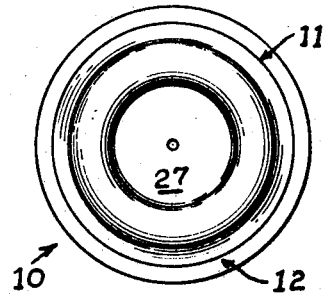
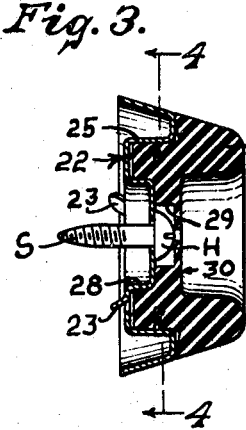
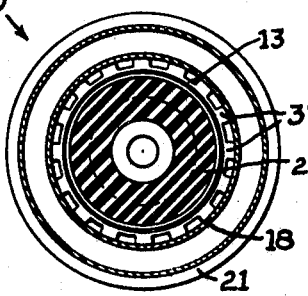
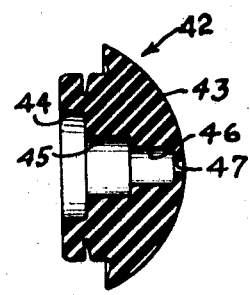
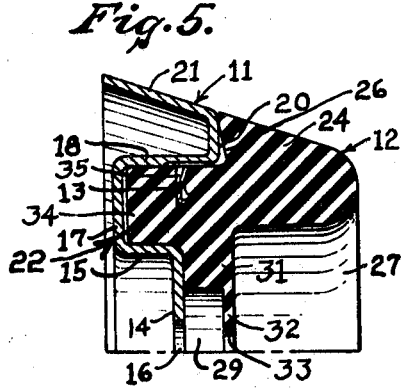
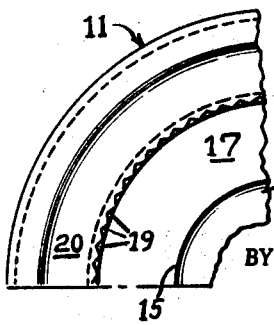
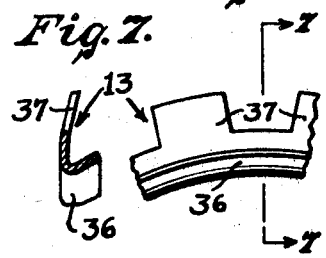
INVENTOR.
ALBERT E. HAND
BY Lowry & Rinehart
ATTYS.

United States Patent Office 3,386,125
Patented June 4, 1968

3,386,125
DOOR BUMPER
Albert E. Hand, Southington, Conn., assignor to Emhart Corporation, Bloomfield, Conn., a corporation of Connecticut
Filed Oct. 14, 1965, Ser. No. 496,072
17 Claims. (Cl. 16—86)

ABSTRACT OF THE DISCLOSURE

A door bumper having a mounting frame, a retainer and a bumper element wherein said bumper element is placed into a recess of the mounting frame, said recess being open outwardly in a direction away from said mounting frame and wall structure. The retainer is mounted on the bumper element to form a specific subcombination structure which is placed into the said recess after the mounting frame has been placed into position on the wall behind a swinging door. This bumper is of a simple and child-proof construction in that once the door bumper is put into place the retainer holds it in the said recess through the use of a forceful frictional bearing engagement.

Specification

This invention relates to a novel door bumper or door stop, and in particular to a door bumper of the type adapted to cooperate with a doorknob to stop a door from swinging into, contacting or marring a wall or similar partition structure.

Conventional door bumpers or stops which cooperate directly with a doorknob include numerous disadvantages which are overcome by the novel door bumper of this invention. For example, present-day door bumpers of the doorknob contacting type are generally constructed from numerous individual components which are difficult to assemble yet are subject to accidental or inadvertent disassembly under normal operating conditions. One reason for such accidental disassembly of conventional door bumpers is the absence of an effective means for coupling the usual rubber bumper element to a frame of the door bumper. As the door bumper is subjected to continuous use the continued impact forces of the doorknob against the bumper element can partially or completely uncouple the conventional coupling means. Any partial uncoupling tends to loosen the bumper element and results in less efficient operation of the door bumper. Upon complete uncoupling, the bumper element may be completely removed from the frame, resulting in the loss of the bumper element and/or the inoperativeness of the door bumper.

A primary object of this invention is to overcome the above and other disadvantages of conventional door bumpers by providing a novel door bumper which is constructed from only three components which are readily assembled without special tools, and are not prone to accidental or inadvertent disassembly while in use.

A further object of this invention is to provide a novel door bumper comprising a mounting frame, a retainer and a bumper element, the mounting element including a recess defined in part by a generally circumferential wall, a portion of the bumper element being housed in the recess, the retainer being housed in a circumferential groove of the bumper element portion opening in opposed relationship to the circumferential wall, and a radially outermost portion of the retainer being in forceful bearing engagement with the circumferential wall of the mounting frame, thereby maintaining the mounting frame and bumper element in assembled relationship.

Still another object of this invention is to provide a novel door bumper of the type immediately above described, in which the mounting frame includes means cooperative with the circumferential wall for confining the bumper element portion in the recess whereby accidental disassembly of the mounting frame, retainer and bumper element is precluded.

A further object of this invention is to provide a novel door bumper of the type heretofore described and including means on the circumferential wall of the mounting frame for increasing the bearing engagement between the circumferential wall and the retainer, and a plurality of tongues of the retainer bitingly engaging the last-mentioned means.

Another object of this invention is to provide a novel door bumper constructed in accordance with the foregoing objects, the retainer being of a generally annular configuration, the retainer having a radially innermost portion, and the radially innermost portion being turned toward but terminating short of the circumferential wall of the mounting frame, thereby preventing an exposed radially innermost raw edge of the retainer from cutting the bumper element portion.

Other objects and advantages of the novel door bumper of this invention will become apparent to one skilled in the art from the following description of the embodiments illustrated in the accompanying drawing in which:

FIGURE 1 is a fragmentary side elevational view, partially in section, of a novel door bumper of this invention, and illustrates the door bumper mounted on a vertical wall;

FIGURE 2 is an end elevational view of the door bumper, and illustrates a recess in a bumper element of the door bumper for receiving a push button of a conventional door knob;

FIGURE 3 is an axial cross-sectional view of the door bumper, and illustrates the bumper element assembled to a mounting frame of the door bumper by an annular retainer;

FIGURE 4 is a sectional view of the door bumper taken generally along line 4—4 of FIGURE 3, and illustrates the annular retainer housed in a circumferential groove of the bumper element, and a plurality of tongues of the retainer;

FIGURE 5 is an enlarged fragmentary view of a portion of the door bumper, and illustrates one of the retainer tongues in bearing interlocked engagement with a roughened wall surface of the mounting frame;

FIGURE 6 is a fragmentary end elevational view of a portion of the mounting frame, and more clearly illustrates the roughened wall surface thereof;

FIGURE 7 is a sectional view of the retainer, taken generally along line 7—7 of FIGURE 8, and illustrates a radially innermost portion of the retainer turned radially outwardly;

FIGURE 8 is a fragmentary end view of the retainer, and more clearly illustrates the configuration of the retainer tongues; and FIGURE 9 is an axial cross-sectional view of another bumper element of the invention, and illustrates a convex end surface thereof for contacting conventional door knobs which do not include push buttons.

A novel door bumper or door stop constructed in accordance with this invention is illustrated in FIGURES 1–5 of the drawing, and is generally referred to by the reference numeral 10. The door bumper 10 comprises a mounting frame 11, a bumper element 12 and a retainer 13.

The mounting frame 11 of the door bumper 10 is constructed from metallic material and comprises a central cylindrical boss (unnumbered) defined by a generally circular end wall 14 and an inner circumferential wall 15. The end wall 14 is provided with an opening or aperture 16 through which is partially passed a mounting screw S having a head H. The mounting screw S is passed through the opening 16 prior to the assembly of the frame 11, bumper element 12 and retainer 13, as will be clearly described hereinafter.

An annular wall 17 joins the inner circumferential wall 15 of the frame 11 to an outer circumferential wall 18 having a roughened inner surface defined by a plurality of axially extending circumferentially spaced serrations or grooves 19 (FIGURE 6). The grooves 19 extend from a radially outwardly directed wall 20 toward the annular wall 17 but terminate short thereof, as is best illustrated in FIGURE 5 of the drawing. A peripheral skirt 21 of a generally frusto-conical configuration is integrally joined to the outwardly directed wall 20, and terminates at an edge (unnumbered) which projects slightly beyond the annular wall 17.

The walls 15, 17 and 18 define a generally annular recess 22 opening to the right, as viewed in FIGURES 3 and 5 of the drawing. The annular wall 17 closes the bottom of the recess except for a plurality of openings (unnumbered) formed by tabs 23 struck from the wall 17 and bent to project beyond the peripheral skirt 21 (FIGURE 3). The tabs 23 temporarily hold the mounting frame 11 upon a vertical wall W (FIGURE 1), partition or similar structure, as will be more fully described hereinafter.

The bumper element 12 comprises a first enlarged portion 24 and a second reduced portion 25 defining an annular flange or shoulder 26. The enlarged portion 24 is provided with a recess 27 for receiving a conventional door knob push button. The reduced portion 25 is similarly provided with a first recess 28 for housing the axial boss (unnumbered) and a second smaller recess 29 for accommodating the head H of the screw S (FIGURE 3). The recesses 28, 29 are separated from the recess 27 by a partition 30 defined by a radially inwardly directed thick flange portion 31 and a thinner portion 32 apertured at 33. The recess 28 and the outer circumferential surface of the reduced portion 25 define an axially directed flange 34 which is housed in the recess 22 of the mounting frame 11 (FIGURE 5). The reduced portion 25 of the bumper element 12 is also provided with a circumferential groove 35 opening in opposed relationship to the circumferential wall 18 and housing the retainer 13.

The retainer 13 is substantially annular in configuration and includes a radially innermost portion 36 which is turned radially outwardly and a radially outermost portion which is circumferentially slotted to define a plurality of radially outwardly directed circumferentially spaced tongues 37. The tongues 37 are each angularly offset from a plane normal to the door bumper axis, as is best illustrated in FIGURE 5 of the drawing.

After the mounting frame 11, bumper element 12 and retainer 13 have been manufactured, the bumper element 12 and the retainer 13 are assembled into a subassembly by deformingly forcing the flange 34 through the retainer 13. With the retainer 13 positioned in the groove 35 of the bumper element 12, each of the tongues 37 project beyond the outer surface of the reduced portion 25 of the element 12. The subassembly (bumper element 12 and retainer 13), the mounting frame 11 and the mounting screw S are then suitably packaged for subsequent sale.

A purchaser of the disassembled door bumper 10 first positions the mounting frame 11 against the vertical wall W and strikes the frame 11 with a hammer which imbeds the tabs 23 to temporarily hold the frame 11 on the wall W. The screw S is then inserted through the aperture 16 and driven home to secure the mounting frame 11 in its permanent position with the head H of the screw S seated against the circular wall 14.

The bumper element 12 and the retainer 13 are held in axial alignment with the now mounted frame 11. The bumper element 12 is then struck with a hammer, mallet or similar instrument, causing the forceful introduction of the axial flange 34 into the recess 22 and the tongues 37 of the retainer 13 into forceful frictional bearing engagement with the roughened surface or serrations 19 of the mounting frame wall 18. The door bumper 10 is thus completely assembled and is prevented from being accidentally or inadvertently disassembled by the clamping of the axial flange 34 between the walls 15, 18 which, in conjunction with the retainer 13, effects an interference fit of the bumper element 12 and the frame 11. That is, the axial flange is both compressed between the walls 15, 18 and clamped between the wall 15 and the retainer 13, thus making it virtually impossible to disassemble the bumper element 12 and the frame 11 except by introducing a screwdriver or similar instrument into the spaces between the tongues 37 and prying the retainer 13 radially outwardly. Since a person unfamiliar with the construction of the door bumper 10 would be basically unable to assume how the components thereof are coupled together, particularly because of the flange 26 overlying the wall 20, the door bumper 10 is virtually tamper-proof. However, a person familiar with the door bumper construction can readily disassemble the mounting frame 11 and the bumper element 12, as well as remove the entire bumper 10 from the wall W by inserting a screwdriver through the aperture 16 and unthreading the screw S.

While the bumper element 12 represents a preferred construction of one of the components of the door bumper 10, a similar bumper element 42 (FIGURE 9) can be employed in lieu thereof. The bumper element 42 is identical to the bumper element 12 but with two exceptions. A major difference is the provision of a generally convex surface 43 of the bumper element 42 which is particularly adapted for contacting a conventional door knob of the type devoid of a push button. In such a case, the recess 27 of the bumper element 12 is unnecessary, and is eliminated in the bumper element 42.

Secondly, in addition to recesses 44, 45, which accommodate the axial boss of the mounting frame 11 and the head H of the screw S, respectively, the bumper element 42 is provided with a recess 46 opening outwardly of the surface 43 by means of an aperture or opening 47. The function of the recess 46 is to receive the bit of a screwdriver inserted through the aperture 47 when a mounting frame with which the bumper element 42 is associated is to be removed from a wall.

It is to be understood that the foregoing description is merely illustrative of preferred forms of the invention, and that the invention is not limited thereto but is to be determined by the following claims.

What is claimed is:

1. A door bumper comprising a mounting frame, a retainer and a bumper element, said mounting frame including a recess open outwardly in a direction away from said mounting frame, said recess defined in part by a generally circumferential wall having a diameter of a size effective to contain a portion of said bumper element, said bumper element having said portion housed in said recess, said portion including a circumferential groove opening in opposed relationship to said circumferential wall, said retainer being of a substantially annular configuration, said retainer including radial innermost and outermost portions, said retainer being housed by said circumferential groove, and the radially outermost portion of said retainer being in forceful frictional bearing engagement with said circumferential wall, said engaged portion being within said diameter of said wall, thereby maintaining said mounting frame and bumper element in assembled relationship.

2. A door bumper comprising a mounting frame, a retainer and a bumper element, said mounting frame including a recess open outwardly in a direction away from said mounting frame, said recess defined in part by a generally circumferential wall having a diameter of a size effective to contain a portion of said bumper element, said bumper element having said portion housed in said recess, said portion including a circumferential groove opening in opposed relationship to said circumferential wall, said retainer being of a substantially annular configuration, said retainer including radially innermost and outermost portions, said retainer being housed by said circumferential groove, the radially outermost portion of said retainer being in forceful frictional bearing engagement with said circumferential wall, said engaged portion being within said diameter of said wall, and means cooperative with said circumferential wall for confining said bumper element portion in said recess whereby said mounting frame and bumper element are maintained in assembled relationship and accidental disassembly of the mounting frame, retainer and bumper element is precluded.

3. A door bumper comprising a mounting frame, a retainer and a bumper element, said mounting frame including a recess open outwardly in a direction away from said mounting frame, said recess defined in part by inner and outer radially spaced circumferential walls having diameters of a size effective to contain a portion of said bumper element, said portion of said bumper element being housed in said recess and confined between said circumferential walls, said portion including a circumferential groove opening in opposed relationship to one of said circumferential walls, said retainer being of a substantially annular configuration, said retainer including radially innermost and outermost portions, said retainer being housed by said circumferential groove, and one of said retainer portions being in forceful frictional bearing engagement with said one circumferential wall, said engaged portion being within said diameter of said wall, thereby maintaining said mounting frame and bumper element in assembled relationship and precluding the inadvertent disassembly thereof.

4. The door bumper as defined in claim 3, wherein said one circumferential wall is provided with a roughened surface in contacting engagement with said one retainer portion.

5. The door bumper as defined in claim 3, wherein said recess opens outwardly of said mounting frame in a first direction, and said one retainer portion is angularly directed in said first direction.

6. The door bumper as defined in claim 3, wherein said one circumferential wall is provided with a roughened surface in contacting engagement with said one retainer portion, said recess opening outwardly of said mounting frame in a first direction, and said one retainer portion is angularly directed in said first direction.

7. A door bumper comprising a mounting frame, a retainer and a bumper element, said mounting frame including a recess open outwardly in a direction away from said mounting frame, said recess defined in part by inner and outer radially spaced circumferential walls having diameters of a size effective to contain a portion of said bumper element, said portion of said bumper element being housed in said recess and confined between said circumferential walls, said portion including a circumferential groove opening in opposed relationship to one of said circumferential walls, said retainer being of a substantially annular configuration, said retainer including radially innermost and outermost portions, said retainer being housed by said circumferential groove, one of said retainer portions being directed toward and being in forceful frictional bearing engagement with said one circumferential wall, said engaged portion being within said diameter of said wall, and the other of said retainer portions being turned toward but terminating short of said one circumferential wall.

8. A door bumper comprising a mounting frame, a retainer and a bumper element, said mounting frame including a recess defined in part by inner and outer radially spaced circumferential walls, a radially outwardly directed wall integrally joined to said outer circumferential wall, said bumper element having first and second portions, said first portion being enlarged relative to said second portion, thereby defining an annular shoulder, said second portion of said bumper element being housed in said recess and confined between said circumferential walls, said shoulder being in opposed relationship to said radially outwardly directed wall, the second portion of said bumper element including a circumferential groove opening in opposed relationship to one of said circumferential walls, said retainer being of a substantially annular configuration, said retainer including radially innermost and outermost portions, said retainer being housed by said circumferential groove, and one of said retainer portions being directed toward and being in bearing engagement with said one circumferential wall, thereby maintaining said mounting frame and bumper element in assembled relationship and precluding the inadvertent disassembly thereof.

9. The door bumper as defined in claim 8, wherein said one circumferential wall is provided with a roughened surface in contacting engagement with said one retainer portion.

10. The door bumper as defined in claim 8, wherein said recess opens outwardly of said mounting frame in a first direction, and said one retainer portion is angularly directed in said first direction.

11. The door bumper as defined in claim 8, wherein said one circumferential wall is provided with a roughened surface in contacting engagement with said one retainer portion, said recess opening outwardly of said mounting frame in a first direction, and said one retainer portion is angularly directed in said first direction.

12. The door bumper as defined in claim 8, including an annular wall between said inner and outer radially spaced circumferential walls, a peripheral skirt joined to said radially outwardly directed wall, and said peripheral skirt being directed toward and projecting beyond said annular wall.

13. A door bumper comprising a mounting frame, a retainer and a bumper element, said mounting frame including a recess defined by inner and outer circumferential walls and an annular wall therebetween, a radially outwardly directed wall joined to said outer circumferential wall, a peripheral skirt joined to said radially outwardly directed wall, said peripheral skirt being directed toward said annular wall, said bumper element having first and second portions, said first portion being enlarged relative to said second portion, thereby defining an annular shoulder, said second portion of said bumper element being housed in said recess, said shoulder being in opposed relationship to said radially outwardly directed wall, the second portion of said bumper element including a circumferential groove opening in opposed relationship to said outer circumferential wall, said retainer being of a substantially annular configuration, said retainer including radially innermost and outermost portions, said retainer being housed by said circumferential groove, and said radially outermost retainer portion being directed toward and being in bearing engagement with said outer circumferential wall, thereby maintaining said mounting frame and bumper element in assembled relationship and precluding the inadvertent disassembly thereof.

14. A door bumper comprising a mounting frame, a retainer and a bumper element, said mounting frame including a recess defined by inner and outer circumferential walls and an annular wall therebetween, a radially outwardly directed wall joined to said outer circumferential wall, a peripheral skirt joined to said radially outwardly directed wall, said peripheral skirt being directed toward said annular wall, said bumper element having first and second portions, said first portion being enlarged relative to said second portion, thereby defining an annular shoulder, said second portion of said bumper element being housed in said recess, said shoulder being in opposed relationship to said radially outwardly directed wall, the second portion of said bumper element including a circumferential groove opening in opposed relationship to said outer circumferential wall, said retainer being of a substantially annular configuration, said retainer including radially innermost and outermost portions, said retainer being housed by said circumferential groove, said radially innermost retainer portion being turned toward but terminating short of said outer circumferential wall, and said radially outermost retainer portion being directed toward and being in bearing engagement with said outer circumferential wall, thereby maintaining said mounting frame and bumper element in assembled relationship and precluding the inadvertent disassembly thereof.

15. A door bumper comprising a mounting frame, a retainer and a bumper element, said mounting frame including a recess defined by inner and outer circumferential walls and an annular wall therebetween, said outer circumferential wall being provided with a roughened surface, a radially outwardly directed wall joined to said outer circumferential wall, a peripheral skirt joined to said radially outwardly directed wall, said peripheral skirt being directed toward said annular wall, said bumper element having first and second portions, said first portion being enlarged relative to said second portion, thereby defining an annular shoulder, said second portion of said bumper element being housed in said recess, said shoulder being in opposed relationship to said radially outwardly directed wall, the second portion of said bumper element including a circumferential groove opening in opposed relationship to said outer circumferential wall, said retainer being of a substantially annular configuration, said retainer including radially innermost and outermost portions, said outermost retainer portion including a plurality of circumferentially spaced radially outwardly directed tongues, said retainer being housed by said circumferential groove, and said radially outermost retainer portion being directed toward and being in bearing engagement with said outer circumferential wall, thereby maintaining said mounting frame and bumper element in assembled relationship and precluding the inadvertent disassembly thereof.

16. A door bumper comprising a mounting frame, a retainer and a bumper element, said mounting frame including a recess defined by inner and outer circumferential walls and an annular wall therebetween, a radially outwardly directed wall joined to said outer circumferential wall, a peripheral skirt joined to said radially outwardly directed wall, said peripheral skirt being directed toward said annular wall, said bumper element having first and second portions, said first portion being enlarged relative to said second portion, thereby defining an annular shoulder, said second portion of said bumper element being housed in said recess, said shoulder being in opposed relationship to said radially outwardly directed wall, the second portion of said bumper element including a circumferential groove opening in opposed relationship to said outer circumferential wall, said retainer being of a substantially annular configuration, said retainer including radially innermost and outermost portions, said outermost retainer portion including a plurality of circumferentially spaced radially outwardly directed tongues, said tongues being directed away from said annular wall, said retainer being housed by said circumferential groove, and said radially outermost retainer portion being directed toward and being in bearing engagement with said outer circumferential wall, thereby maintaining said mounting frame and bumper element in assembled relationship and precluding the inadvertent disassembly thereof.

17. A door bumper comprising a mounting frame, a retainer and a bumper element, said frame including a recess defined by inner and outer circumferential walls and an annular wall therebetween, said outer circumferential wall having an innermost roughened surface, a radially outwardly directed wall joined to said outer circumferential wall, a peripheral skirt joined to said radially outwardly directed wall, said peripheral skirt being directed toward said annular wall, said bumper element having first and second portions, said first portion being enlarged relative to said second portion, thereby defining an annular shoulder, said second portion of said bumper element being housed in said recess, said shoulder being in opposed relationship to said radially outwardly directed wall, the second portion of said bumper element including a circumferential groove adjacent said shoulder opening in opposed relationship to the roughened surface of said outer circumferential wall, said retainer being of a substantially annular configuration, said retainer being housed by said circumferential groove, said retainer including radially innermost and outermost portions, said radially innermost retainer portion being turned toward but terminating short of said roughened surface of said outer circumferential wall, said outermost retainer portion including a plurality of circumferentially spaced radially outwardly directed tongues, said tongues being directed away from said annular wall, and said tongues terminating in bearing engagement against said roughened surface of said outer circumferential wall.

References Cited

UNITED STATES PATENTS

| | | | |
|---|---|---|---|
| 2,182,611 | 12/1939 | Covert | 16—86 |
| 2,899,703 | 8/1959 | Johnson | 16—86 |
| 3,050,770 | 8/1962 | Morse | 16—86 |

MARVIN A. CHAMPION, *Primary Examiner.*

E. J. McCARTHY, *Assistant Examiner.*